No. 781,789. PATENTED FEB. 7, 1905.
C. SCHMIDT.
BRAKE AND MOTOR CONTROLLING MECHANISM FOR MOTOR VEHICLES.
APPLICATION FILED JULY 5, 1904.
2 SHEETS—SHEET 2.
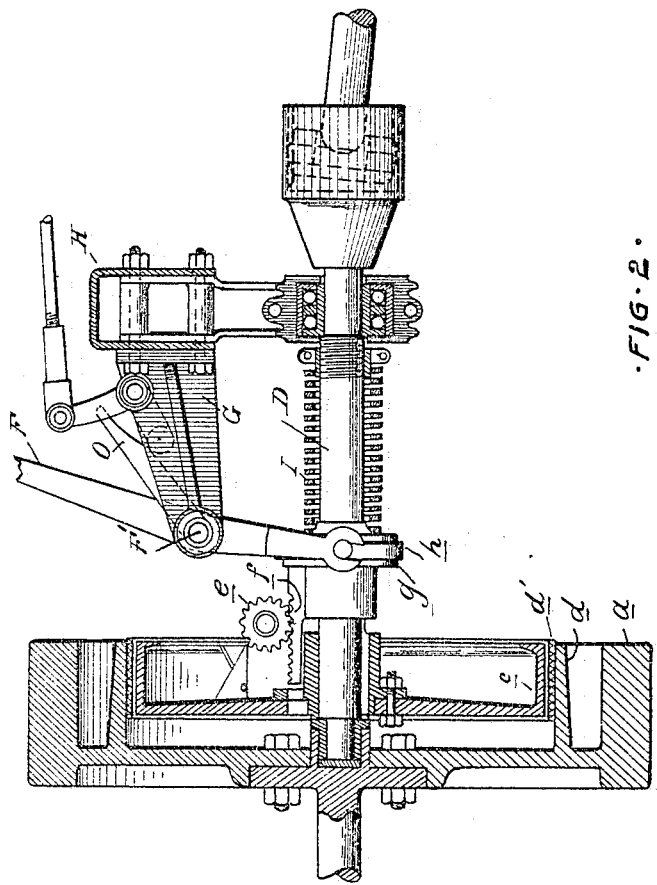
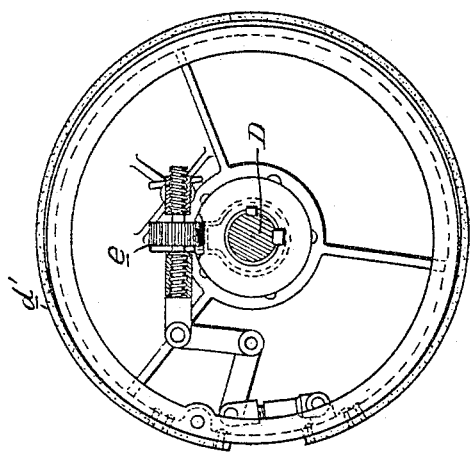
WITNESSES
INVENTOR
CHARLES SCHMIDT
BY
ATTY.

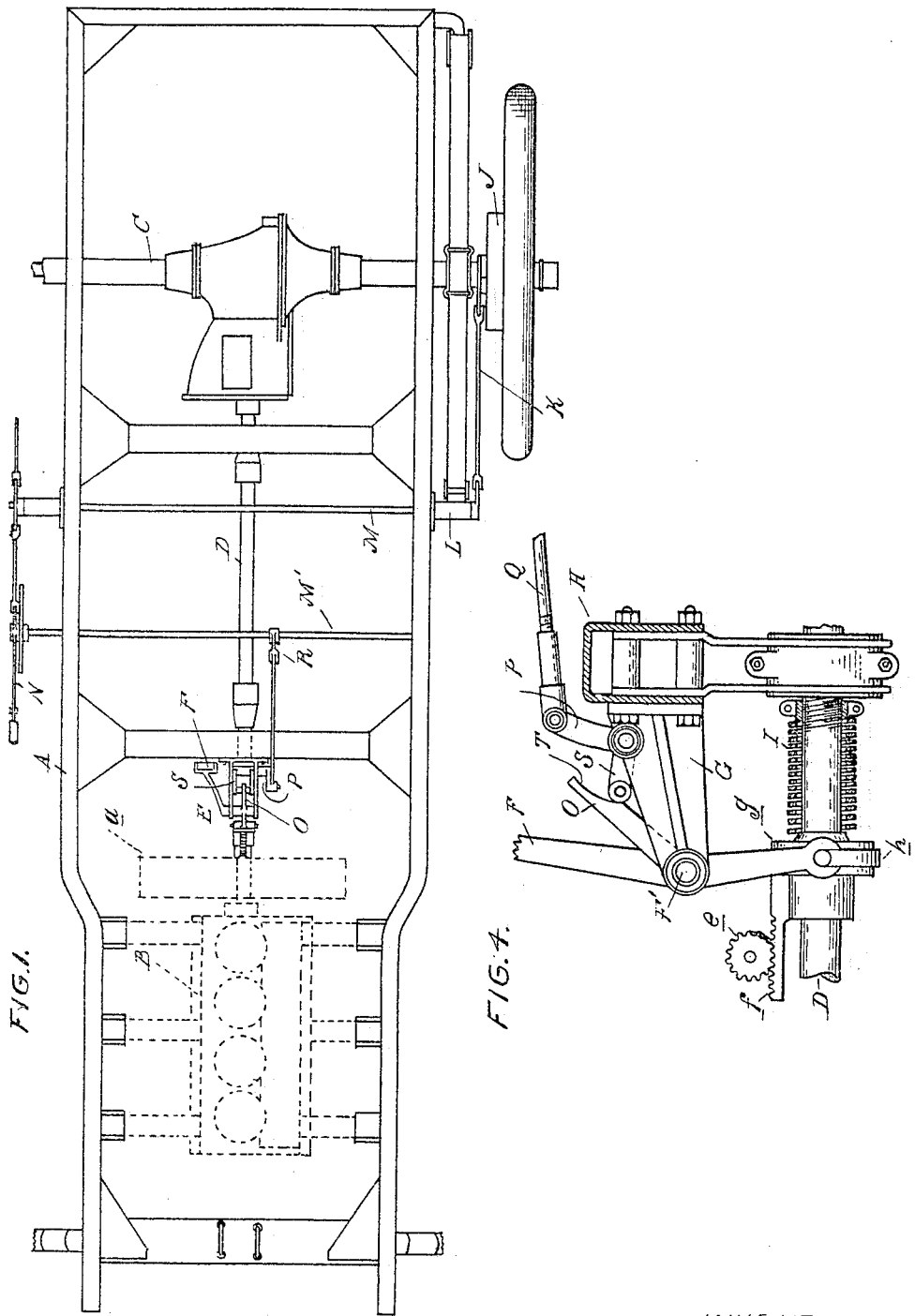

No. 781,789.                                          Patented February 7, 1905.

UNITED STATES PATENT OFFICE.

CHARLES SCHMIDT, OF DETROIT, MICHIGAN, ASSIGNOR TO THE PACKARD MOTOR CAR COMPANY, OF DETROIT, MICHIGAN, A CORPORATION OF WEST VIRGINIA.

BRAKE AND MOTOR CONTROLLING MECHANISM FOR MOTOR-VEHICLES.

SPECIFICATION forming part of Letters Patent No. 781,789, dated February 7, 1905.

Application filed July 5, 1904. Serial No. 215,272.

*To all whom it may concern:*

Be it known that I, CHARLES SCHMIDT, a citizen of the United States, residing at Detroit, in the county of Wayne and State of Michigan, have invented certain new and useful Improvements in Brake and Motor Controlling Mechanism for Motor-Vehicles, of which the following is a specification, reference being had therein to the accompanying drawings.

The invention consists in the peculiar construction of the brake and power-transmission mechanism whereby the application of the brake automatically releases a clutch in the transmission mechanism, said clutch being also operable independently of the brake.

In the drawings, Figure 1 is a plan of a motor-vehicle to which my improvement is applied. Fig. 2 is a section through a portion of the transmission mechanism, illustrating its connection with the brake mechanism. Fig. 3 is a transverse section; and Fig. 4 is a view similar to Fig. 2, showing the parts in different positions of adjustment.

A is the frame of the vehicle, B is a motor supported thereon, and C the drive-shaft.

D is a transmission-shaft extending between the motor and drive-shaft, and E is a clutch for connecting said shaft to the drive-shaft. The clutch shown comprises the fly-wheel *a* of the engine, which is preferably provided with the annular flange *d*, within which is arranged a circular head *c*, mounted upon the transmission-shaft D. Between the head *c* and the flange *d* is an expansible ring *d'*, which is connected through suitable mechanism comprising a pinion *e* and rack *f* with a longitudinal slidable sleeve *g* on the shaft D. This sleeve *g* is grooved to receive the collar *h*, which is pivotally connected to the bifurcated end of a foot-lever F, fulcrumed in the bracket G on the cross-bar H of the frame. The arrangement is such that by operating the foot-lever F the sleeve *g* is moved to contract the expansible ring and release the clutch, said clutch being again engaged automatically by the operation of a spring I when the lever is released.

The vehicle is provided with a suitable brake mechanism, which, as shown, comprises the brake-head J on the axle, connected by the links K with rock-arms L on the rock-shaft M. This rock-shaft is operated by a controlling-lever N, by means of which the brake may be set or released. As it is desirable to disconnect the motor from the drive-axle whenever the brake is applied, I have provided automatic means for effecting this result, which is of the following construction: O is a rock-arm which is connected to the rock-shaft F' of the foot-lever F. P is a rock-arm journaled in the bracket G and connected by the link Q with the rock-arm R on the rock-shaft M, to which the lever N is attached. The rock-arm P is connected to the rock-arm S, which swings in the path of the rock-arm O and is adapted to actuate the latter, so as to move the foot-lever F and release the clutch. The construction of parts is such that in the initial movement of the lever N and before the brake has been set thereby the rock-arm S will be actuated to move the arm O and release the clutch, as just described. During the continued movement of the lever N the lever F is maintained in its releasing position, and this is effected by providing the rock-arm O with the segmental portion T, which after the initial movement of the rock-arm S is arranged concentric with the axis of said rock-arm, so that the latter is free to move without imparting further movement to the rock-arm O. This rock-arm O is, however, held from being returned by the spring I as long as the rock-arm S is in engagement with the segmental portion T.

From the description above given it will be understood that every time the brake is operated the clutch E is released, so as to disconnect the motor from the drive-axle, and upon the releasing of said brake the spring I will automatically reëngage the clutch. It will be also understood that the connections which cause this operation of the clutch do not interfere with its independent operation through the actuation of the foot-lever F.

What I claim as my invention is—

1. In a motor-vehicle, the combination with a frame and a motor supported thereon, a drive-axle and a transmission-shaft extending between said motor and said drive-axle, of a clutch for coupling said motor to said transmission-shaft, a foot-lever for operating said clutch, a brake mechanism, an operating-lever therefor, a connection between said brake-operating mechanism and said foot-lever, whereby the operation of the brake will release said clutch, and means for limiting the movement imparted to said clutch to the initial movement of said brake-operating mechanism.

2. In a motor-vehicle, the combination with a frame and a motor supported thereon, a drive-axle and a transmission-shaft extending between said motor and drive-axle, of a clutch for coupling said motor to transmission-shaft, a foot-lever for releasing said clutch, a brake mechanism, a rock-arm actuated thereby, an arm on said foot-lever extending into the path of said rock-arm, whereby the operation of said brake will automatically actuate said foot-lever to release said clutch, and means for limiting the movement imparted to said clutch to the initial movement of said brake-operating mechanism.

3. In a motor-vehicle, the combination with a frame and a motor supported thereon, a drive-axle, a transmission-shaft extending between said motor and said drive-axle, of a clutch for coupling said motor to said transmission-shaft, a foot-lever for releasing said clutch, a brake mechanism, a rock-arm actuated thereby, and an arm on said foot-lever having a segmental portion and extending into the path of said rock-arm whereby the initial movement of said brake mechanism will arrange said segmental portion concentric with the radius of said rock-arm.

4. In a motor-vehicle, the combination with a frame and a motor supported thereon, a drive-axle and a transmission-shaft extending between said motor and drive-axle, of a clutch for coupling said motor to said transmission-shaft, a foot-lever for releasing said clutch, a brake mechanism, a rock-arm actuated thereby, and an arm on said foot-lever having a segmental portion and extending into the path of said rock-arm whereby the initial movement of said brake mechanism will release said clutch and arrange said segmental portion of said arm concentric with the radius of said rock-arm.

In testimony whereof I affix my signature in presence of two witnesses.

CHARLES SCHMIDT.

Witnesses:
    Jas. P. Barry,
    E. D. Ault.